United States Patent [19]

Kamada et al.

[11] Patent Number: 4,525,537
[45] Date of Patent: Jun. 25, 1985

[54] METHACRYLIC RESIN SHAPED ARTICLE, PROCESS FOR PRODUCING THE SAME AND PROCESS FOR PRODUCING A SHAPED ARTICLE HAVING A MAT SURFACE FROM SAID RESIN SHAPED ARTICLE

[75] Inventors: Kazumasa Kamada, Hiroshima; Katsumi Tamai; Kazunori Abe, Ohtake; Yoshinobu Shiraishi, Ohtake, all of Japan

[73] Assignee: Mitsubishi Rayon Co., Ltd., Tokyo, Japan

[21] Appl. No.: 500,439

[22] Filed: Jun. 2, 1983

[30] Foreign Application Priority Data

Jun. 3, 1982 [JP] Japan ................................. 57-95524

[51] Int. Cl.³ ............................................. C08L 33/12
[52] U.S. Cl. ..................................... 525/198; 525/228
[58] Field of Search ............................... 525/228, 198

[56] References Cited

U.S. PATENT DOCUMENTS 2,941,977 6/1960 Roche et al. ..................... 525/198
3,415,796 10/1968 Souder et al. .
3,992,486 11/1976 Lang ................................. 525/228
4,108,923 8/1978 Mast et al. .
4,159,288 6/1979 Carson et al. .

FOREIGN PATENT DOCUMENTS 0073450 3/1983 European Pat. Off. ............ 525/228
1554781 1/1970 Fed. Rep. of Germany .
57-8643 4/1982 Japan .
2030924 4/1980 United Kingdom .

Primary Examiner—Allan M. Lieberman
Attorney, Agent, or Firm—Cushman, Darby & Cushman

[57] ABSTRACT

A novel methacrylic resin shaped article is made of novel compositions comprising (A) 80 to 99.9% by weight of methyl methacrylate polymer or copolymer, which forms continuous phase, and (B) 0.1 to 20% by weight of a polymer obtained from at least one unsaturated monomer of the general formula

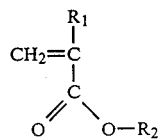

wherein $R_1$ is H or methyl group and $R_2$ is a hydrocarbon radical of at least two carbon atoms, a derivative or monomer mixture thereof, the respective refractive indexes ($n_A$) and ($n_B$) of said (A) and (B) polymers satisfying the relation of $0.998 \leq n_B/n_A \leq 1.002$. The above shaped article has a latent mat surface, which therefore may be converted to a mat surface merely by means of stretching at a temperature above heat distortion temperature.

21 Claims, No Drawings

METHACRYLIC RESIN SHAPED ARTICLE, PROCESS FOR PRODUCING THE SAME AND PROCESS FOR PRODUCING A SHAPED ARTICLE HAVING A MAT SURFACE FROM SAID RESIN SHAPED ARTICLE

This invention relates to a methacrylic resin shaped article having a latent mat surface, process for producing the same, and a process for producing a methacrylic resin shaped article having a mat surface by stretching said resin shaped article having a latent mat surface at a temperature above its heat distortion temperature. More particularly, it relates to a novel methacrylic resin shaped article having a latent mat surface which comprises a continuous phase formed of a polymer obtained from methyl methacrylate alone or from a polymerizable unsaturated monomer mixture containing 80% by weight or more of methyl methacrylate, and a dispersed phase formed of a polymer which has a specified refractive index relative to that of the polymer forming the continuous phase and which is obtained from (meth)acrylic acid [(meth)acrylic acid means herein and hereunder acrylic acid or methacrylic acid] ester having a specified composition alone or from a polymerizable unsaturated monomer mixture containing 50% by weight or more of at least one of the (meth)acrylic acid esters mentioned above, a process for producing the same, and a process for producing a methacrylic resin shaped article which has a mat surface by stretching said resin shaped article having a latent mat surface at a temperature above its heat distortion temperature. The expression "latent mat surface" as used in this specification means a glossy surface which can be converted to a mat surface by stretching a methacrylic resin shaped article at a specific temperature.

Prior methods for obtaining a shaped resin article having a mat surface include those wherein (1) a polymerizable unsaturated monomer or a partially polymerized unsaturated monomer is poured into a mold having a mat surface, and the surface pattern of the mold is transferred to the surface of the molded article, (2) a thermoplastic material is pressed onto a mat surface at a temperature above its heat distortion temperature, and the mat surface pattern is transferred to the surface of the thermoplastic material, (3) a thermoplastic resin surface is contacted with finely dispersed particles of, e.g., carborundum to scratch the surface and give a mat surface, and (4) as a simpler method, a thermoplastic resin is irradiated on its surface by an actinic light (ultraviolet light from a low pressure type mercury-vapor lamp or a carbon-arc lamp), and thereafter stretched at a temperature above its heat distortion temperature to give a mat surface.

However, these methods mentioned above require special steps to obtain a mat surface which complicate the process for producing the shaped articles.

The object of this invention is to provide a methacrylic resin shaped article having a latent mat surface requiring no such special steps as in the prior art, process for producing the same, and a process for producing a methacrylic resin shaped article having a mat surface from said methacrylic resin shaped article having a glossy surface.

It has been found that a methacrylic resin shaped article which comprises a continuous phase formed of a polymer obtained from methyl methacrylate as principal structural unit and a dispersed phase of a polymer of a specified (meth)acrylic acid ester of this invention, when the ratio of refractive indices of the two polymers forming the continuous and dispersed phase respectively is selected to be in a specified range in the neighborhood of 1, can be formed into a methacrylic resin shaped article having a beautiful mat surface by stretching the shaped article of glossy surface while keeping a condition that substantially no light diffusing due to the dispersed phase takes place inside the resin.

Thus, this invention relates to a methacrylic resin shaped article made of a composition comprising 80 to 99.9% by weight of a polymer [A] which forms a continuous phase and 0.1 to 20% by weight of a polymer [B] which forms a dispersed phase, said polymer [A] being a polymer obtained from methyl methacrylate alone or from a polymerizable unsaturated monomer mixture containing 80% by weight or more of methyl methacrylate, said polymer [B] being a polymer obtained from at least one polymerizable unsaturated monomer represented by the general formula [I]

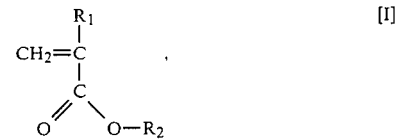

wherein $R_1$ represents a hydrogen atom or a methyl group and $R_2$ represents a hydrocarbon radical having at least 2 carbon atoms or a derivative thereof, or obtained from a polymerizable unsaturated monomer mixture containing 50% by weight or more of at least one polymerizable unsaturated monomer represented by the above general formula [I], and the refractive index ($n_A$) of said polymer [A] and the refractive index ($n_B$) of said polymer [B] satisfying the following relation:

$$0.998 \leq n_B/n_A \leq 1.002,$$

a process for producing the same, and a process for producing a methacrylic resin of mat surface from methacrylic resin of glossy surface.

The "refractive index" as used in this specification refers to the value determined at 20° C. for sodium D-line The methacrylic resin shaped article of this invention comprises two phases of a continuous phase and a dispersed phase, and the refractive index of the polymer [A] which forms the continuous phase and that of the polymer [B] which forms the dispersed phase are correlated in a specified manner, that is, there exists between the refractive index ($n_A$) of the polymer [A] and the refractive index ($n_B$) of the polymer [B], in terms of $n_B/n_A$, a relation expressed by the formula: $0.998 \leq n_B/n_A \leq 1.002$. As a consequence, the methacrylic resin shaped article according to this invention, when not used in combination with a light diffusing agent such as titanium oxide, aluminum hydroxide, or styrene/methyl methacrylate copolymer, is transparent. (The term "transparent" herein means that when the transmitted light is observed with the naked eye, substantially no fuzziness of the background is observed).

The $n_B/n_A$ value of the methacrylic resin material according to this invention lies in the range $0.998 \leq n_B/n_A \leq 1.002$. When the $n_B/n_A$ value is in the range $n_B/n_A < 0.998$ or $1.002 < n_B/n_A$, the resulting methacrylic resin shaped article has a poor transparency, and the object of this invention cannot be attained. Further, since the methacrylic resin shaped article of this invention is stretched to give a methacrylic resin shaped article having a beautiful mat surface, the dispersion of the dispersed phase into the continuous phase is required to be uniform. In general, the dispersion is preferably uniform in such a degree that no local unevenness is observed in total luminous transmittance and light scattering characteristics when the transmitted light is observed with the naked eye. The particle size of the dispersed particle of dispersed phase is not specifically restricted microscopically, but there exists a preferable range of the size. In the resin according to this invention, the shape of the dispersed particle is not restricted specifically. When the radius of the dispersed particle is too small, the degree of surface dullness of the methacrylic resin shaped article tends to be insufficient, while the radius is too large, the appearance of the mat surface of the methacrylic resin shaped article tends to be poor.

The size of individual dispersed particles forming the dispersed phase of this invention cannot be observed directly because of the transparency of the resulting methacrylic resin composition. But it is preferably 0.1 to 500 μm and more preferably 0.5 to 100 μm.

The methacrylic resin composition of this invention comprises 80–99.9% by weight of a polymer [A] which forms a continuous phase and 0.1 to 20% by weight of a polymer [B] which forms a dispersed phase. When the proportion of the polymer [B] which forms the dispersed phase is less than 0.1% by weight, the degree of surface dullness of the methacrylic resin shaped article is insufficient, while when the proportion of the polymer [B] is in excess of 20% by weight, although the degree of surface dullness of the resulting shaped article is satisfactory, the weather resistance, solvent resistance, strength and heat resistance of the methacrylic resin composition or the methacrylic resin shaped article tend to become low, which is unfavorable in general. In the range of proportion mentioned above, it is more preferable that the proportion of polymer [A] which forms the continuous phase is 90–99.5% by weight and that of polymer [B] which forms the dispersed phase is 0.5 to 10% by weight.

The polymer [A] which forms the continuous phase of the methacrylic resin composition of this invention is formed of polymethyl methacrylate or of a polymer [A] obtained from a polymerizable unsaturated monomer mixture containing 80% by weight or more of methyl methacrylate. Specific examples of polymerizable unsaturated monomers which may be added into the polymerizable unsaturated monomer mixture containing 80% by weight or more of methyl methacrylate and can be copolymerized with methyl methacrylate include esters of saturated monohydric alcohols with (meth)acrylic acid such as methyl acrylate, ethyl (meth)acrylate, propyl (meth)acrylate, butyl (meth)acrylate, 2-ethylhexyl (meth)acrylate, cyclohexyl (meth)acrylate, and benzyl (meth)acrylate; esters of unsaturated monohydric alcohols with (meth)acrylic acid such as allyl (meth)acrylate; esters of polyhydric alcohols with (meth)acrylic acid such as ethylene glycol di(meth)acrylate, 1,3-butylene glycol di(meth)acrylate, trimethylolethane tri(meth)acrylate, trimethylolpropane tri(meth)acrylate, pentaerythritol tetra(meth)acrylate, 2-hydroxyethyl (meth)acrylate, and 2-hydroxypropyl (meth)acrylate; (meth)acrylic acid, styrene or a styrene derivative. These polymerizable unsaturated monomers are added in an amount of less than 20% by weight of the monomer mixture. When the proportion of methyl methacrylate is below 80% by weight, the strength, weather resistance and heat resistance of the methacrylic resin composition or the shaped article thereof tend to be low and the costs of raw materials tend to be high.

Preferred examples of the above-mentioned polymerizable unsaturated monomers which are copolymerized with methyl methacrylate include esters of saturated monohydric alcohols with (meth)acrylic acid. Preferred specific examples thereof include methyl acrylate, ethyl (meth)acrylate, butyl (meth)acrylate, and 2-ethylhexyl (meth)acrylate.

In a preferred embodiment of this invention, the amount of the polymerizable unsaturated monomer to be copolymerized with methyl methacrylate is less than 10% by weight of the monomer mixture.

Thus, in a preferred embodiment the polymer [A] which forms the continuous phase of the methacrylic resin composition of this invention is polymethyl methacrylate or a polymer obtained from a mixture of 90% by weight or more of methyl methacrylate and 10% by weight or less of a polymerizable unsaturated monomer selected from methyl acrylate, ethyl (meth)acrylate, butyl (meth)acrylate, and 2-ethylhexyl (meth)acrylate.

The polymer [B] which forms the dispersed phase of the methacrylic resin composition of this invention has a specified refractive index defined in claims of this invention relative to the refractive index of the polymer [A] which forms the continuous phase and is a polymer of a polymerizable unsaturated monomer represented by the formula [I] mentioned above alone or a polymer obtained from a polymerizable unsaturated monomer mixture containing 50% by weight or more of at least one polymerizable unsaturated monomer represented by the formula [I].

Typical examples of the polymerizable unsaturated monomers represented by the formula [I] include the following compounds. The figure in the parenthesis indicates the refractive index of the polymer.

2,2,2-Trifluoroisopropyl methacrylate: (1.4185)
2,2,2-Trifluoroethyl methacrylate: (1.437)
Isopropyl acrylate: (1.456)
2-Ethylhexyl acrylate: (1.478)
n-Butyl acrylate: (1.466)
tert-Butyl methacrylate: (1.467)
Ethyl acrylate: (1.4685)
Isopropyl methacrylate: (1.473)
Monofluoroethyl methacrylate: (1.478)
n-Hexyl methacrylate: (1.481)
n-Butyl methacrylate: (1.483)
n-Propyl methacrylate: (1.484)
Ethyl methacrylate: (1.485)
2-Methylcyclohexyl methacrylate: (1.503)
Cyclohexyl methacrylate: (1.504)
2-Chlorocyclohexyl methacrylate: (1.518)
2-Cyclohexylcyclohexyl methacrylate: (1.518)
2-Bromoethyl methacrylate: (1.543)
Benzyl methacrylate: (1.568).

As further examples mention may be made of isobutyl methacrylate, n-hexyl acrylate, cyclohexyl acrylate, and 2-ethylhexyl methacrylate.

The polymerizable unsaturated monomer represented by the formula [I] may be used singly or in a suitable combination of two or more thereof.

In view of the object of this invention, among the properties required for the polymer [B] which forms the dispersed phase, of primary importance are that the ratio of its refractive index to that of the polymer [A] which forms the continuous phase falls within a specified range and that it can be dispersed in the continuous phase in a satisfactory state. However, from the standpoint of production of the methacrylic resin composition of this invention, it is advantageous, because of ease of handling, that the polymer [B] is in the glassy state. Accordingly, in a preferred embodiment of a process for obtaining the methacrylic resin composition of this invention, a basic compound is selected as a monomer which gives a polymer having relatively high Tg from a group consisting of tert-butyl methacrylate, ethyl methacrylate, cyclohexyl methacrylate and benzyl methacrylate taking the refractive index into consideration; the compound is used alone or in combination of two or more thereof or in combination of one or more thereof with other compounds represented by the formula [I] or other polymerizable unsaturated monomer to be polymerized or copolymerized, giving a polymer which is in the glassy state at room temperature and has the desired refractive index; and the polymer obtained is used as the polymer [B] which forms the dispersed phase.

As the polymer [B] which forms the dispersed phase in this invention, from the viewpoint of handling of the resulting polymer, copolymers such as cyclohexyl methacrylate/tert-butyl methacrylate copolymer, ethyl methacrylate/cyclohexyl methacrylate copolymer, and cyclohexyl methacrylate/tert-butyl methacrylate/-methyl methacrylate copolymer are preferred.

As a polymer [B] which forms the dispersed phase of the methacrylic resin composition of this invention, there may be used a polymer obtained by copolymerizing a polymerizable unsaturated monomer represented by the formula [I] with other polymerizable unsaturated monomers. Specific examples of the other polymerizable unsaturated monomer which may be copolymerized include styrene and its derivatives such as styrene and α-methylstyrene, methyl (meth)acrylate and esters of polyhydric alcohols with (meth)acrylic acid such as ethylene glycol di(meth)acrylate, 1,3-butylene glycol di(meth)acrylate, trimethylolethane tri(meth)acrylate, trimethylolpropane tri(meth)acrylate, and pentaerythritol tetra(meth)acrylate.

Representative examples of above-mentioned monomers are styrene and methyl methacrylate.

These polymerizable unsaturated monomers which can be copolymerized with a compound represented by the formula [I] are added in a proportion of less than 50% by weight in the polymerizable unsaturated monomer mixture. When the proportion of the compound represented by the formula [I] in the mixture is less than 50% by weight, even when the relationship between the refractive index of the polymer [A] and that of the polymer [B] is within the range specified in this invention, the state of dispersion of the polymer [A] in the polymer [B] is difficult to control, which is unfavorable in general. In a particularly preferred embodiment of this invention, the polymerizable unsaturated monomer represented by the formula [I] is added in a proportion of 80% or more by weight.

The continuous phase and the dispersed phase are formed respectively of the polymer [A] and the polymer [B], each characterized as mentioned above. Depending on conditions for production of the methacrylic resin composition of this invention, however, there may be cases where a very small amount of polymer [A] is present within the polymer [B] which forms the dispersed phase. Even in such cases these methacrylic resin composition are not excluded out of the scope of this invention.

The methacrylic resin composition of this invention is fundamentally composed of two phases of the continuous and dispersed phase mentioned above. But the composition may also contain various additives used in conventional methacrylic resins. Specific examples of these additives are dyes used for coloring, stabilizers such as antioxidants or ultraviolet absorbers, flame retardants, and release agents to facilitate the release of resin from the mold.

Further, conventional pigments such as titanium oxide, barium sulfate, calcium carbonate, or aluminum hydroxide, or light diffusing agents such as polystyrene or styrene/methyl methacrylate copolymer, which are insoluble in the polymers forming the continuous and dispersed phases and form the third phase may also be mentioned as an additive. Generally, when a light diffusing sheet to which the above-mentioned light diffusing agent has been added is subjected to stretching, the light transmission becomes high and the light diffusion property becomes poor. When a new dispersed phase consisting of the polymer [B] of this invention is formed in such a light diffusing resin composition, the optical characteristics of the methacrylic resin composition are not affected, but in the methacrylic resin shaped article the surface becomes dull and the deterioration of light diffusion property can be prevented. Thus, a new methacrylic resin composition having low dependency of optical characteristics on stretch ratio which may be obtained by utilizing the latent mat surface of this invention may also be mentioned as an example of possible application of this invention.

The shape of the methacrylic resin composition of this invention is not restricted specifically so long as it permits stretching. A typical example is a sheet. The thickness of the resin sheet is not restricted specifically, but generally in the range of 0.2 to 20 mm, and more commonly, 1 to 10 mm.

The process for producing the methacrylic resin composition of this invention will be explained in the followings.

The process for producing the methacrylic resin composition of this invention is not restricted specifically. In a preferred embodiment, however, the polymer [B] to form the dispersed phase is prepared beforehand; it is then dissolved or dispersed in a polymerizable unsaturated monomer or a partially polymerized monomer, or a polymerizable unsaturated monomer mixture or a partially polymerized monomer, which are to form the polymer [A] of the continuous phase, to give a polymerizable composition; and the polymerizable composition is then polymerized to produce the methacrylic resin shaped article of this invention comprising two phases of the continuous phase formed of the polymer [A] and the dispersed phase formed of the polymer [B].

Thus, the process of this invention comprises dissolving or dispersing 0.1 to 20% by weight of a polymer [B] obtained from a polymerizable unsaturated monomer represented by the formula [I] mentioned above or from a polymerizable unsaturated monomer mixture containing 50% by weight or more of a polymerizable unsaturated monomer represented by the formula [I] in 80 to 99.9% by weight of methyl methacrylate, or a polymerizable unsaturated monomer mixture containing 80% by weight or more of methyl methacrylate, or a partially polymerized monomers, which are to be converted into the polymer [A] to form the continuous phase, then polymerizing the resulting solution or dispersion in the presence of a radical polymerization initiator and usually in a mold to produce the methacrylic resin article of this invention comprising two phases consisting of a continuous phase formed of the polymer [A] and a dispersed phase formed of the polymer [B].

In the process mentioned above, the method for preparing the polymer [B] which forms the dispersed phase is not restricted specifically and there may be used emulsion polymerization, solution polymerization, or bulk polymerization, which are conventional industrially. In general, however, the polymer [B] is preferably prepared by suspension polymerization in an aqueous medium. The method of suspension polymerization is advantageous in that the polymer obtained is easy to handle and that the dissolution or dispersion of the polymer [B] into the polymer [A] which forms the continuous phase is relatively easy.

The polymerization degree of the polymer [B] is in the range of 0.004 to 0.01 in terms of intrinsic viscosity [$\eta$] (l/g) as determined at 20° C. in chloroform. When the intrinsic viscosity [$\eta$] is below 0.004 the mat effect is unsatisfactory, while an intrinsic viscosity above 0.01 is unfavorable in point of dissolution of the polymer.

As the polymerizable composition to be converted into the polymer [A] which forms the continuous phase of the methacrylic resin composition of this invention, there may be used any of methyl methacrylate, a polymerizable unsaturated monomer mixture containing 80% by weight or more of methyl methacrylate, or a partially polymerized these monomers. It is generally advantageous, when the productivity is taken into consideration, to use a partially polymerized monomers. For obtaining such partially polymerized composition, there may also be used a method to dissolve a polymer prepared beforehand in a polymerizable unsaturated monomer. But in a preferred embodiment the partially polymerized monomer are generally obtained by adding a radical initiator to a polymerizable unsaturated monomer and heating the resulting composition to its boiling point.

The polymer [B] which is to form the dispersed phase is dissolved or dispersed in a polymerizable composition which is to be converted to the polymer [A] which forms the continuous phase. In order that the mat surface of the methacrylic resin shaped article is optically uniform, the polymer [B] is preferably dissolved uniformly in the polymerizable composition. Whether it is dissolved uniformly or not can be judged easily from the transparency of the mixture. When the mixture is transparent or only slightly turbid, the mat surface of the methacrylic resin shaped article is optically uniform in general.

To the mixture obtained by dissolving or dispersing the polymer [B] in the polymerizable composition which is to form the polymer [A], is added a radical polymerization initiator, and the resulting mixture is poured into a desired mold and polymerized in the mold.

Specific examples of the polymerization initiator include azo initiator such as 2,2'-azobis(isobutyronitrile), 2,2'-azobis(2,4-dimethylvaleronitrile), and 2,2'-azobis(2,4-dimethyl-4-methoxyvaleronitrile), organic peroxides such as benzoyl peroxide and lauroyl peroxide, or so-called redox initiator formed by combining an oxidizing agent with a reducing agent.

The amount of the polymerization initiator to be used is 0.01 to 5.0% by weight based on the amount of the monomer.

Although heating is sometimes not needed in polymerization when a redox initiator is used, the polymerization is usually effected by heating the polymerizable mixture at 40° C. to 150° C. after pouring the mixture into the mold. It is particularly preferable to heat at 50° C. to 95° C. in the first step and succeedingly at 100° to 140° C. in the second step to complete the polymerization.

Preferred examples of the mold used in polymerization are a pair of tempered glass plates sealed on the periphery with a soft gasket and a pair of endless stainless steel belts mirror-polished on each one side, opposed to each other, and sealed on the periphery with a soft gasket, which belts proceed at the same speed in the same direction.

Among the processes for producing the methacrylic resin shaped article of this invention mentioned above, a particularly preferred embodiment of the process of this invention is a process which comprises dissolving or dispersing a polymer [B] which is to form the dispersed phase in a polymerizable composition which has a polymer conversion percentage of 15 to 25% by weight and is to be converted to the polymer [A] which forms the continuous phase, adding an azo or organic peroxide type initiator to the resulting solution or dispersion, pouring the resulting mixture continuously between a pair of endless stainless steel belts, which are mirror-polished on each one side, opposed to each other, sealed on the periphery with a soft gasket and proceed at the same speed in the same direction, from the upstream end of the belts, heating the mixture to complete the polymerization, and taking out the resin sheet continuously from the downstream end.

For obtaining a methacrylic resin shaped article having a mat surface of this invention, the methacrylic resin composition obtained by the process mentioned above is stretched at a temperature above the heat distortion temperature of said resin composition, preferably at 100° to 200° C. Temperatures below 100° C. or above 200° C. are not preferred because at the former temperatures the surface mat effect is not exhibited, while at the latter temperatures troubles such as foaming occur.

Since, in the methacrylic resin composition obtained by the process described above, the ratio of the refractive index ($n_B$) of the polymer [B] forming the dispersed phase to that ($n_A$) of the polymer [A] forming the continuous phase, $n_B/n_A$, is within the range defined by the formula $0.998 \leq n_B/n_A \leq 1.002$, the methacrylic resin composition obtained forms a transparent resin sheet unless a light diffusing agent is jointly used. This methacrylic resin shaped article is subjected at a temperature above, normally 10° C. or more above, its heat distortion temperature to stretching, such as plane biaxial stretching by use of, e.g., a tenter, plane uniaxial stretching, curved surface biaxial stretching and curved surface uniaxial stretching, to give a methacrylic resin shaped article having a mat surface.

The heat distortion temperature herein refers to the distortion temperature as determined according to ASTM D648-45T. Typical examples of the methods of biaxial stretching include conventional methods such as free blowing, vacuum forming, and ejection molding. The degree of surface dullness becomes marked gradually with the stretch ratio (a value calculated by the formula $\{\sqrt{d_o/d} - 1\} \times 100\%$, wherein $d_o$ is the thickness of the sheet before stretching and d is that after stretching of the sheet) increasing from 0% to about 50%. But when the stretch ratio goes above about 50%, the increase in the degree of surface dullness with the change in stretch ratio becomes small.

This invention will be illustrated below with reference to Examples.

In Examples, "%" means % by weight and "part" means part by weight. The gloss was measured by use of Glossmeter (made by Tokyo Denshoku Co.) at an angle of incidence of 60° and at an angle of reflection of 60°. The intrinsic viscosity of the polymer to form the dispersed phase was measured at 25° C. in chloroform. The total luminous transmittance of the resin was determined according to JIS K 7105.

EXAMPLE 1

(1) Preparation of cyclohexyl methacrylate/tert-butyl methacrylate copolymer (polymer [B] which forms the dispersed phase)

Into a 50 liter autoclave provided with a stirrer, a thermometer, and a jacket, were placed the following materials:

Monomer phase:
  Cyclohexyl methacrylate: 13 kg (65 parts)
  tert-Butyl methacrylate: 7 kg (35 parts)
  n-Octyl mercaptan: 0.4 kg (2 parts)
  2,2'-Azobis(isobutyronitrile): 0.02 kg (0.1 part)
Dispersion medium:
  Deionized water: 30 kg (150 parts)
  Sodium sulfate: 0.1 kg (0.5 part)
  Dispersion stabilizer: 0.004 kg (0.02 part)
    (Copolymer of methyl methacrylate and potassium sulfopropyl methacrylate).

The autoclave was flushed with nitrogen for 20 minutes with stirring at 200 r.p.m. Then polymerization was carried out by circulating hot water of 80° C. through the jacket. When the peak of heat generation due to polymerization was confirmed after 90 minutes and the temperature inside the autoclave became lower than that of the circulating water, the temperature was brought to and kept at 115° C. by steam heating to complete the polymerization. The content of the autoclave was cooled by putting water in the jacket. The resulting copolymer was washed and then dried at 60° C. The cyclohexyl methacrylate/tert-butyl methacrylate copolymer obtained had an intrinsic viscosity of 0.0082 l/g.

(2) Preparation of a methacrylic resin material

In a conventional manner, into a tempered glass cell sealed on the periphery with a soft gasket, was poured a transparent composition consisting the following components:

| | |
|---|---|
| Partially polymerized methyl methacrylate (Polymer content: 21%) | 96 parts |
| Cyclohexyl methacrylate/tert-butyl methacrylate copolymer obtained in (1) above | 4 parts |
| 2,2'-Azobis(2,4-dimethyl-valeronitrile) | 0.05 part |
| Tinuvin P (Ultraviolet absorber from Ciba Geigy) | 0.01 part |
| Sodium dioctyl sulfosuccinate (Release agent) | 0.001 part |

The cell was allowed to stand for 1 hour in a water bath kept at 82° C., and then placed in a hot-air recirculation oven at 120° C. for 2 hours to complete the polymerization. There was obtained a transparent methacrylic resin sheet having a thickness of 3 mm and no optical unevenness observable with the naked eye. The resin material had a value of $n_B/n_A$ of 0.999 and a heat distortion temperature of 91° C. The particle size of the polymer [B] formed the dispersed phase was 2 to 5 μm.

(3) The transparent methacrylic resin sheet having a thickness of 3 mm obtained in (2) above was subjected to ejection molding at 170° C. to obtain a methacrylic resin shaped article having a beautiful mat surface. The properties of the resin sheet before and after the stretching were as shown in Table 1.

TABLE 1

| Stretch ratio (%) $\{\sqrt{d_0/d} - 1\} \times 100\%$ | Total luminous transmittance (%) | | Retention of surface gloss after ejection molding (%) (Gloss before ejection molding = 100) |
|---|---|---|---|
| | Before ejection molding | After ejection molding | |
| Example 1 | | | |
| 83.5 | 92.9 | 89.1 | 15.3 |

EXAMPLES 2 to 6, COMPARATIVE EXAMPLE 1

In a conventional manner, between a pair of endless stainless steel belts mirror-polished on each one side, opposed to each other, sealed on the periphery with a soft gasket and moved at the same speed toward the same direction, was poured continuously from the upstream end a transparent composition consisting the following components:

| | |
|---|---|
| Partially polymerized methyl methacrylate (Polymer content: 19%) | In an amount indicated in Table 2 |
| Copolymer obtained in (1) of Example 1 | |
| 2,2'-Azobis(2,4-dimethyl-valeronitrile) | 0.05 part |
| Tinuvin P (Ultraviolet absorber from Ciba Geigy) | 0.01 part |
| Sodium dioctyl sulfosuccinate (Release agent) | 0.001 part |

The composition was passed through a hot water shower zone of 82° C. in the course of 28 minutes, then passed through a far infrared radiation heating zone, where it was heated up to a temperature of maximum 125° C., and an annealing zone in the course of 14 minutes. There was thus obtained continuously from the downstream end a transparent methacrylic resin sheet having a thickness of 3 mm and no optical unevenness observable with the naked eye.

The methacrylic resin sheet having a thickness of 3 mm obtained above was stretched by ejection molding at 170° C. to obtain a methacrylic resin shaped article having a mat surface. The optical characteristics before and after the ejection molding were as shown in Table 2.

TABLE 2

|  | Partially polymerized methyl methacrylate (part) | Cyclohexyl methacrylate/ tert-butyl methacrylate copolymer (part) | Heat distortion temperature (°C.) | Stretch ratio (%) [calculated by $(\sqrt{d_o/d} - 1) \times 100\%$] | Total luminous transmittance (%) Before stretching | Total luminous transmittance (%) After stretching | Retention of surface gloss after ejection molding (%) (Gloss before ejection molding = 100) |
|---|---|---|---|---|---|---|---|
| Example 2 | 97.6 | 2.4 | 89 | 75 | 93.0 | 89.9 | 26.2 |
| Example 3 | 97.1 | 2.9 | 88 | " | " | 89.2 | 22.6 |
| Example 4 | 96.6 | 3.4 | 88 | " | " | 89.9 | 17.3 |
| Example 5 | 95.7 | 4.3 | 87 | " | " | 89.1 | 13.4 |
| Example 6 | 95.2 | 4.8 | 87 | " | " | 89.0 | 12.8 |
| Comparative example 1 | 100 | 0 | 94 | " | 93.6 | — | 96.6 |

EXAMPLES 7 to 9

The procedures in (1) of Example 1 were repeated except that a polymerizable unsaturated monomer mixture having the composition shown in Table 3 was used. There was obtained a copolymer which was to be the polymer [B] that forms the dispersed phase. By using the resulting copolymer and in the same manner as in (2) of Example 1, a transparent methacrylic resin sheet having a thickness of 3 mm was obtained. The methacrylate resin sheet was then stretched at 170° C. to give a methacrylic resin shaped article having a beautiful mat surface. The results were as shown in Table 3.

TABLE 3

|  | Composition of polymerizable unsaturated monomer mixture (parts) Refractive index ratio $n_B/n_A$ Intrinsic viscosity of polymer obtained $[\eta]$ | Heat distortion temperature (°C.) | Stretch ratio (%) [calculated by $(\sqrt{d_o/d} - 1) \times 100\%$] | Retention of surface gloss after ejection molding (%) (Gloss = 100) |
|---|---|---|---|---|
| Example 7 | Cyclohexyl methacrylate (52) tert-Butyl methacrylate (28) Methyl methacrylate (20) $n_B/n_A = 0.999$ $[\eta] = 0.0088$ (l/g) | 87 | 77.1 | 19.0 |
| Example 8 | Ethyl methacrylate (63.2) Cyclohexyl methacrylate (36.8) $n_B/n_A = 1.000$ $[\eta] = 0.0095$ (l/g) | 87 | 78.0 | 23.8 |
| Example 9 | Cyclohexyl methacrylate (45.5) tert-Butyl methacrylate (24.5) Methyl methacrylate (30) $n_B/n_A = 0.999$ $[\eta] = 0.0094$ (l/g) | 88 | 28.4 37.3 50.7 72.1 | 41.0 34.9 29.4 23.5 |

EXAMPLE 10

In a conventional manner, between a pair of tempered glass plates, was poured a composition consisting the following components:

| Partially polymerized methyl methacrylate (Polymer content: 6.5%) | 95 parts |
| Cyclohexyl methacrylate/tert-butyl methacrylate copolymer | 5 parts |
| Weight ratio of charge Cyclohexyl methacrylate/ tert-buty methacrylate | 65/35 |
| 2,2'-Azobis(2,4-dimethyl-valeronitrile) | 0.025 part |
| Trinuvin P (Ultraviolet absorber from Ciba Geigy) | 0.01 part |
| Titanium oxide "Titac R-550" from Sakai Chemicals Co. | 0.9 part |
| Particle diameter 0.3–0.5 μm | |

The whole was immersed for 5 hours in a water bath maintained at 65° C., and then heated for 2 hours in an air bath kept at 120° C. to complete the polymerization. Thus, an opaque white methacrylic resin sheet having a specular gloss and a thickness of 3 mm was obtained.

The heat distortion temperature of the methacrylic resin sheet obtained above was 105° C. The methacrylic resin sheet was heated at 180° C. in a hot-air recirculation oven, and then subjected to free blowing to form a semispherical shaped article having a beautiful mat surface.

COMPARATIVE EXAMPLE 2

The procedures in Example 10 were repeated except that the cyclohexyl methacrylate/tert-butyl methacrylate copolymer was excluded from the composition to be poured in. There was obtained an opaque white methacrylic resin material having a heat distortion temperature of 105° C. In the same manner as in Example 10, the methacrylic resin sheet was heated at 180° C. and then subjected to free blowing to form a semispherical shaped article. There was obtained a methacrylic resin shaped article whose surface was not matted and retained a specular gloss.

What is claimed is:

1. A methacrylic resin shaped article made of a composition which comprises [A] 80 to 99.9% by weight of a polymer which forms a continuous phase and [B] 0.1 to 20% by weight of a polymer which forms a dispersed phase,
said polymer [A] being a polymer obtained from methyl methacrylate alone or from a polymerizable unsaturated monomer mixture containing 80% by weight or more of methyl methacrylate,
said polymer [B] being a polymer obtained from at least one polymerizable unsaturated monomer represented by the general formula [I]

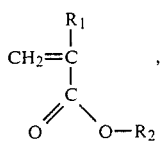  [I]

wherein $R_1$ represents a hydrogen atom or methyl group, and $R_2$ represents a hydrocarbon radical having at least 2 carbon atoms or a derivative thereof, or obtained from a polymerizable unsaturated monomer mixture containing 50% by weight or more of at least one polymerizable unsaturated monomer represented by the above general formula [I], and the refractive index ($n_A$) of said polymer [A] and the refractive index ($n_B$) of said polymer [B] satisfying the following relation:

$0.998 \leq n_B/n_A \leq 1.002$.

2. A methacrylic resin shaped article according to claim 1 wherein the polymerizable unsaturated monomer represented by the general formula [I] mentioned above is the one in which $R_2$ in the formula [I] represents an alkyl, cycloalkyl or aralkyl group having 2 to 18 carbon atoms which is optionally substituted with a halogen.

3. A methacrylic resin shaped article according to claim 1, wherein the polymerizable unsaturated monomer represented by the general formula [I] mentioned above is at least one compound selected from tert-butyl methacrylate, ethyl methacrylate, cyclohexyl methacrylate or benzyl methacrylate.

4. A methacrylic resin shaped article according to claim 1 wherein the polymer [B] which forms the dispersed phase is a cyclohexyl methacrylate/tert-butyl methacrylate copolymer.

5. A methacrylic resin shaped article according to claim 1 wherein the polymer [B] which forms the dispersed phase has an intrinsic viscosity [η] of 0.004 to 0.01.

6. A methacrylic resin shaped article according to claim 1 wherein the polymer [B] which forms the dispersed phase has a particle diameter of 0.1 to 500 μm.

7. A process for producing a methacrylic resin shaped article made of a composition which comprises, for the purpose of producing a methacrylic resin comprising [A] 80 to 99.9% by weight of a polymer which forms a continuous phase and [B] 0.1 to 20% by weight of a polymer which forms a dispersed phase, and the refractive index ($n_A$) of the resulting polymer [A] and the refractive index ($n_B$) of said polymer [B] being selected so as to satisfy the following relation:

$0.998 \leq n_B/n_A \leq 1.002$ dissolving or dispersing, as the said polymer [B], a polymer obtained from at least one polymerizable unsaturated monomer represented by the general formula [I]

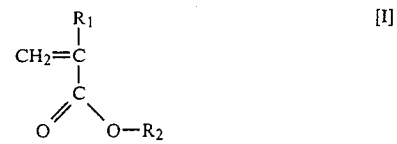  [I]

wherein $R_1$ represents a hydrogen atom or methyl group and $R_2$ represents a hydrocarbon radical having at least 2 carbon atoms or a derivative thereof, or obtained from a polymerizable unsaturated monomer mixture containing 50% by weight or more of a polymerizable unsaturated monomer of the above formula [I], into methyl methacrylate monomer, or a partially polymerized methyl methacrylate monomer, or a polymerizable unsaturated monomer mixture containing 80% by weight or more of methyl methacrylate, or a partially polymerized product of said methyl methacrylate monomer mixture, which are to form the said polymer [A], polymerizing the resulting solution or dispersion in the presence of a radical polymerization initiator to form a shaped article.

8. A process for producing a methacrylic resin shaped article according to claim 7 wherein the polymerizable unsaturated monomer represented by the general formula [I] mentioned above is the one in which $R_2$ in the formula [I] represents an alkyl, cycloalkyl or aralkyl group having 2 to 18 carbon atoms which is optionally substituted by a halogen.

9. A process for producing a methacrylic resin shaped article according to claim 7 wherein the polymerizable unsaturated monomer represented by the general formula [I] mentioned above is at least one compound selected from tert-butyl methacrylate, ethyl methacrylate, cyclohexyl methacrylate or benzyl methacrylate.

10. A process for producing a methacrylic resin shaped article according to claim 7 wherein the polymer [B] which forms the dispersed phase is a cyclohexyl methacrylate/tert-butyl methacrylate copolymer.

11. A process for producing a methacrylic resin shaped article according to claim 7 wherein the polymer [B] which forms the dispersed phase has an intrinsic viscosity [η] of 0.004 to 0.01.

12. A process for producing a methacrylic resin shaped article according to claim 7 wherein said polymerization is carried out in a mold.

13. A process for producing a methacrylic resin shaped article having a mat surface which comprises stretching a methacrylic resin shaped article having a latent mat surface at a temperature above the heat distortion temperature of said shaped article, which methacrylic resin shaped article comprising [A] 80–99.9% by weight of a polymer which forms a continuous phase and [B] 0.1 to 20% by weight of a polymer which forms a dispersed phase,
said polymer [A] being a polymer obtained from methyl methacrylate alone or from a polymerizable unsaturated monomer mixture containing 80% by weight or more of methyl methacrylate,
said polymer [B] being a polymer obtained from at least one polymerizable unsaturated monomer represented by the general formula [I]

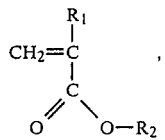

wherein $R_1$ represents a hydrogen atom or methyl group and $R_2$ represents a hydrocarbon radical having at least 2 carbon atoms or a derivative thereof, or obtained from a polymerizable unsaturated monomer mixture containing 50% by weight or more of at least one polymerizable unsaturated monomer represented by the general formula [I] mentioned above, and the refractive index ($n_A$) of said polymer [A] and the refractive index ($n_B$) of said polymer [B] satisfying the following relation:

$$0.998 \leq n_B/n_A \leq 1.002.$$

14. A process for producing a methacrylic resin shaped article having a mat surface according to claim 13 wherein the polymerizable unsaturated Cmonomer represented by the general formula [I] is the one in which $R_2$ in the formula [I] is an alkyl, cycloalkyl or aralkyl group having 2 to 18 carbon atoms which is optionally substituted by a halogen.

15. A process for producing a methacrylic resin shaped article having a mat surface according to claim 13 wherein the polymerizable unsaturated monomer is at least one compound selected from tert-butyl methacrylate, ethyl methacrylate, cyclohexyl methacrylate or benzyl methacrylate.

16. A process for producing a methacrylic resin shaped article having a mat surface according to claim 13 wherein the polymer [B] which forms the dispersed phase is a cyclohexyl methacrylate/tert-butyl methacrylate copolymer.

17. A process for producing a methacrylic resin shaped article having a mat surface according to claim 13 wherein the polymer [B] which forms the dispersed phase has an intrinsic viscosity $[\eta]$ of 0.004 to 0.01.

18. A process for producing a methacrylic resin shaped article having a mat surface according to claim 13 wherein the polymer [B] which forms the dispersed phase has a particle diameter of 0.1 to 500 $\mu$m.

19. A process for producing a methacrylic resin shaped article having a mat surface according to claim 13 wherein the stretching is carried out by free blowing, vacuum forming or ejection molding.

20. A process for producing a methacrylic resin shaped article having a mat surface according to claim 13 wherein the stretching is carried out at a temperature between 100° and 200° C.

21. A process for producing a methacrylic resin shaped article having a mat surface according to claim 13 wherein a degree of surface dullness is 30% or less in terms of percentage retention of surface gloss when the stretch ratio (a value calculated by the formula $\{\sqrt{d_o/d}-1\} \times 100\%$, wherein $d_o$ indicates the thickness of a sheet before stretching and d indicates that after stretching of the sheet) is 50%.

* * * * *